United States Patent [19]

O'Horo et al.

[11] Patent Number: 5,519,767
[45] Date of Patent: May 21, 1996

[54] VOICE-AND-DATA MODEM CALL-WAITING

[75] Inventors: Patrick J. O'Horo, Colts Neck, N.J.; David L. Rowley, Indianapolis, Ind.

[73] Assignee: AT&T Corp., Murray Hill, N.J.

[21] Appl. No.: 504,970

[22] Filed: Jul. 20, 1995

[51] Int. Cl.[6] .......................... H04M 11/06; H04M 3/20
[52] U.S. Cl. ................... 379/97; 379/93; 379/215
[58] Field of Search ........................... 379/93, 94, 96–98, 379/215; 375/222, 216

[56] References Cited

U.S. PATENT DOCUMENTS

| | | | |
|---|---|---|---|
| 4,852,151 | 7/1989 | Dittakavi et al. | 379/97 |
| 4,995,074 | 2/1991 | Goldman et al. | 379/97 |
| 5,081,647 | 1/1992 | Bremer | 375/216 |
| 5,287,401 | 2/1994 | Lin | 379/98 |

*Primary Examiner*—Wing F. Chan
*Attorney, Agent, or Firm*—David Volejnicek

[57] ABSTRACT

The call-waiting feature is supported on voice-and-data modems (22,25) by causing voice-and-data modems to go into voice-only mode upon receipt of the modem clear-down signal (352–354). A first voice-and-data modem engaged in an initial voice-and-data call with a second voice-and-data modem responds to receipt (202) of a call-waiting signal by generating (204) a replica of the call-waiting signal on the user's audio channel. The first modem responds to a user request (300) to pick up the waiting call by sending (306) the modem clear-down signal to the second voice-and-data modem, going (312) into voice-only mode, and transmitting (314) a waiting-call acceptance signal. The initial call that is placed (332) on hold is thus a voice-only call. While in a voice-plus-data picked-up waiting call, the first modem responds to a user request (400) to reinstate the initial call by again sending (406) the modem clear-down signal, going (412) into voice-only mode, and transmitting (422) a call-resumption signal. The first modem is thus in voice-only-mode when it is reconnected (454) to the initial, voice-only, call. The re-connected initial call may now be re-converted into a voice-plus-data call in the conventional manner (424–488).

14 Claims, 5 Drawing Sheets

VOICE-AND-DATA MODEM CALL-WAITING

TECHNICAL FIELD

This invention relates to modems, and specifically to telecommunications features provided by modems.

BACKGROUND OF THE INVENTION

Communication of digital information—such as data—over analog transmission links—such as telephone lines and trunks—is well known in the art. At the transmitting end of the link, a modem uses a representation of the digital information to modulate a carrier frequency and transmits the modulated carrier frequency on the transmission link. At the receiving end of the link, another modem demodulates the carrier frequency to retrieve the representation of the digital information, and reconstitutes the digital information therefrom. The pair of modems engage in a communication protocol that includes control signalling to set up and tear down the communication connection over the link between them.

Modems that handle only digital information are referred to as data-only modems. In the recent past, voice-and-data modems have made their appearance. They create a voice communication channel alongside the data communication channel such that both channels appear as a single communication to the transmission facilities that interconnect the modems. The voice channel is typically created by modulating a second carrier frequency with a representation of the voice signals. An illustrative example thereof is disclosed in U.S. Pat. No. 5,081,647. An alternative voice-and-data modem implementation is digital, wherein the voice signals are encoded into digital form and the encoded voice and data are multiplexed for transmission to the other side.

Telephone networks have traditionally provided a rich set of features for voice telephone calls. One of these features is call waiting. This feature involves interrupting of an ongoing first call with an audible indication that a second call has arrived for one of the parties to the first call. The called party is then given a chance to put the first call on hold or end it, and answer the second call.

As the use of telephone networks has expanded beyond carrying voice calls—to the carrying of data calls via modems, for example—it has become desirable to extend the voice-call features to these other types of calls as well. Accordingly, data-only modems have been modified to support the call waiting feature for data calls. Illustrative examples thereof may be found in U.S. Pat. Nos. 4,852,151 and 5,287,401. However, effectively providing call waiting to multi-media calls, such as voice-and-data calls, is a much more complex matter. This is because multiple channels of communication are involved in the call, and so their handling must be properly coordinated in providing the feature. As a consequence, the call-waiting feature has heretofore not been supported by voice-and-data modems.

SUMMARY OF THE INVENTION

This invention is directed to solving these and other problems and disadvantages of the prior art. Generally according to the invention, the call-waiting feature is supported on voice-and-data modems and is provided thereby to multimedia communications (e.g., voice-and-data calls). Specifically according to the invention, a voice-and-data modem for use in a telecommunications system that provides the call-waiting feature includes first means that communicate selectively in either voice-plus-data mode or voice-only mode with another voice-and-data modem in the system, and second means that respond to receipt of a call-waiting signal by causing the first means to transmit to the other modem a command to communicate in voice-only mode, by causing the first means to communicate in voice-only mode, and finally by causing the first means to transmit a waiting-call acceptance signal. As a consequence of the waiting-call acceptance signal, the communication (e.g., call) with the other modem, which is now a voice-only communication, is placed on hold, and the waiting communication is connected to the subject modem. The subject modem also includes third means that cause the first means to transmit a call-resumption signal when the first means is communicating in the voice-only mode. As a consequence of the call-resumption signal being transmitted while the modem is connected to the formerly-waiting communication, the formerly-waiting communication is disconnected from the subject modem and the on-hold communication is re-connected to the subject modem. The subject modem further includes fourth means that respond to receipt from the other modem of a command to communicate in voice-only mode, by causing the first means to communicate in voice-only mode. This allows the subject modem to place the communication with the other modem in voice-only mode when the subject modem finds itself in the position of the other modem (that is, when the waiting call is waiting for the other modem and not the subject modem).

For supporting the ability to return to the initial call from a waiting call that is a voice-and-data call, the third means preferably include selectively-activatable means that cause the first means to transmit a command to communicate in voice-only mode, that cause the first means to communicate in voice-only mode, and that finally cause the first means to transmit the call-resumption signal. The subject modem is thereby returned to a voice-only mode of operation prior to being reconnected with the on-hold voice-only call with the other mode.

For supporting the ability to convert the returned-to initial call back into a voice-and-data call, the subject modem further includes conventional selectively-activatable means that cause the first means to transmit a command to the other modem to change from communicating in the voice-only mode to communicating in the voice-plus-data mode, and that cause the first means to change from communicating in the voice-only mode to communicating in the voice-plus-data mode.

Preferably, the command transmitted by a modem to cause the receiving modem to communicate in voice-only mode is the modem clear-down signal. This allows the support for call-waiting to be implemented in voice-and-data modems by means of conventional modem signaling.

These and other advantages and features of the invention will become more apparent from the following description of an illustrative embodiment of the invention taken together with the drawing.

BRIEF DESCRIPTION OF THE DRAWINGS

FIGS. 2–4 are a flow diagram of operations performed by elements of the telecommunications system of FIG. 1 to implement an embodiment of voice-and-data modem call waiting.

DETAILED DESCRIPTION

Figure 1:
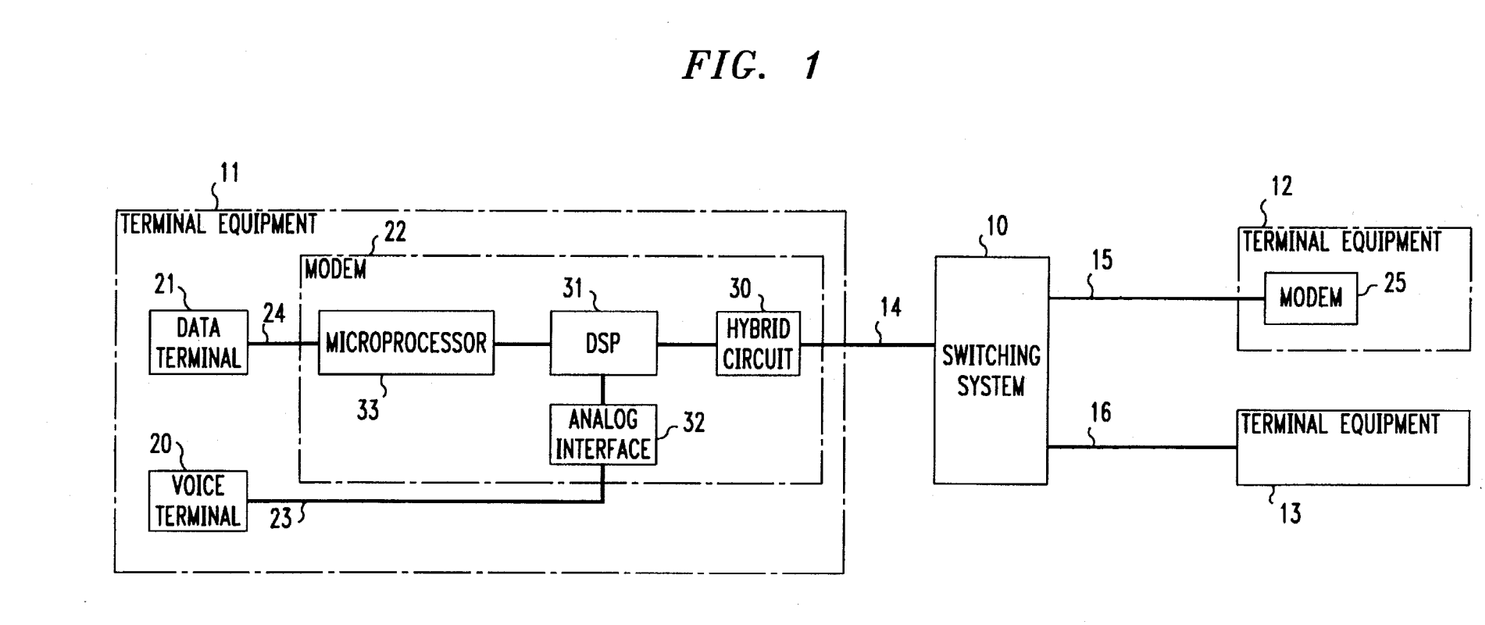
FIG. 1 is a block diagram of an illustrative telecommunications system that implements an illustrative embodiment of the invention.

Referring to FIG. 1, a telephone system includes a switching system 10, such as a telephone local central office, that provides telephone connections over analog telephone lines 14–16 between terminal equipment 11–13 of subscribers. Switching system 10 provides subscribers with the call-waiting feature. Each subscriber's terminal equipment includes a voice terminal 20, such as a telephone, or a data terminal 21, such as a PC plus a modem 22, or both as in the case of terminal equipment 11. In the case of terminal equipment 12, the modem is designated as 25 to differentiate it from the modem 22 of terminal equipment 11, but the two modems are functionally compatible. In order to permit simultaneous use of both voice terminal 20 and data terminal 21 on a single telephone line 14, modem 22 is a voice-and-data modem. Voice-and-data modems are known in the art. Modem 22 is illustratively constructed according to the teachings of U.S. Pat. No. 5,081,647, which is incorporated herein by reference.

Modem 22 comprises a hybrid circuit 30 which interfaces the other circuitry of modem 22 to telephone line 14, and a digital signal processor (DSP) 31 which performs the signal processing functions such as carrier modulation and demodulation, control signal generation and detection, and analog/digital conversion. Modem 22 further comprises an analog interface 32 which interfaces voice terminal 20 to DSP 31 via a voice channel 23, and a microprocessor 33 which interfaces data terminal 21 to DSP 31 via a data channel 24 and also controls the operation of modem 22. Both DSP 31 and microprocessor 33 are program-controlled devices that include memory for storing programs that they execute on processing units.

At least one of the other terminal equipment 12–13 also must include a voice-and-data modem 25, so that a user of terminal equipment 11 has a counterpart with whom he or she can carry on simultaneous voice-and-data calls. Such calls are set up and torn down in the conventional manner.

Figure 5:
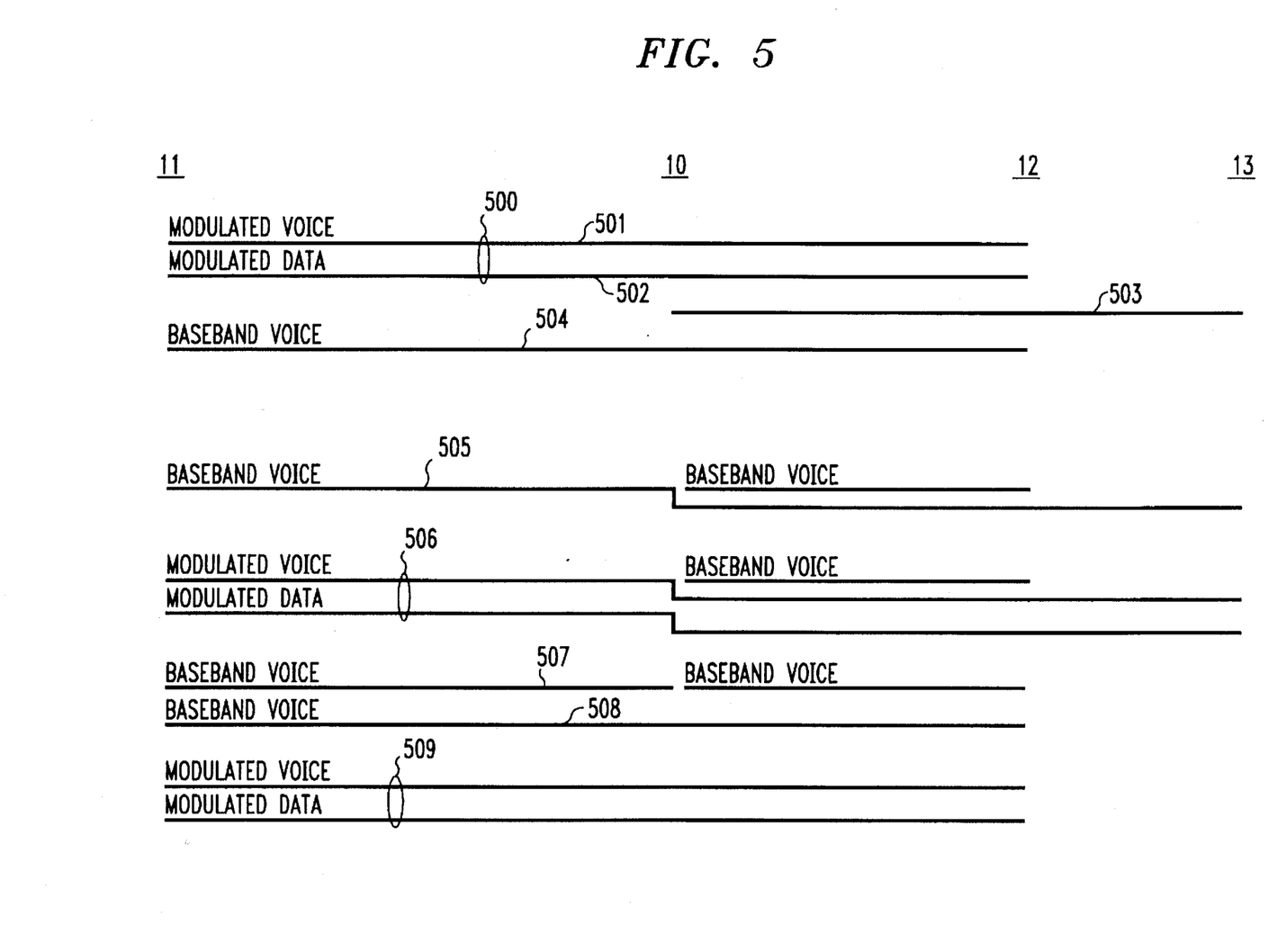
FIG. 5 is a diagram of communications forms engaged in by elements of the telecommunications system of FIG. 1 during the operations of FIGS. 2–4.

A call between terminal equipment 11 and 12 is set up as a baseband call, i.e., a normal telephone call, in that DSPs 31 at both ends of the call engage in normal telephone signalling to set up the call. If the call was initiated or accepted at a voice terminal of terminal equipment 11 or 12, the call will remain, at least temporarily after being set up, a baseband call. In a baseband call, modems 22 and 25 are in a voice-only mode of operation, wherein DSP 31 of modem 22 directly connects voice channel 23 to the telephone line 14. Modem 25 does likewise. The effect is as if voice terminals were directly connected to telephone lines 14 and modems 22 were not there. This is illustrated by call 504 in FIG. 5. Later in response to a user request, or if the call was initiated and accepted at data terminals of terminal equipment 11 and 12, modems 22 and 25 undertake signalling between each other across the call connection to convert the call to a voice-and-data call where both voice and data are conveyed on the call path in modulated form on separate channels (separate carriers). This is illustrated by call 500 in FIG. 5, showing the separate modulated voice channel 501 and the modulated data channel 502 of the voice-and-data call 500.

Let us assume that there is a voice-and-data call in existence between terminal equipment 11 and 12, and that another call for terminal equipment 11 comes into switching system 10, from terminal equipment 13 for example. The other call can be of any type: voice, data, or voice-and-data. It is represented by call 503 in FIG. 5. Since switching system 10 was described above as providing the call-waiting feature, switching system 10 responds to the incoming call by transmitting a conventional call-waiting signal on telephone line 14 to terminal equipment 11, in the conventional manner.

As described so far, the telephone system of FIG. 1, including modems 22 and 25, is conventional in construction and operation.

Figure 2:
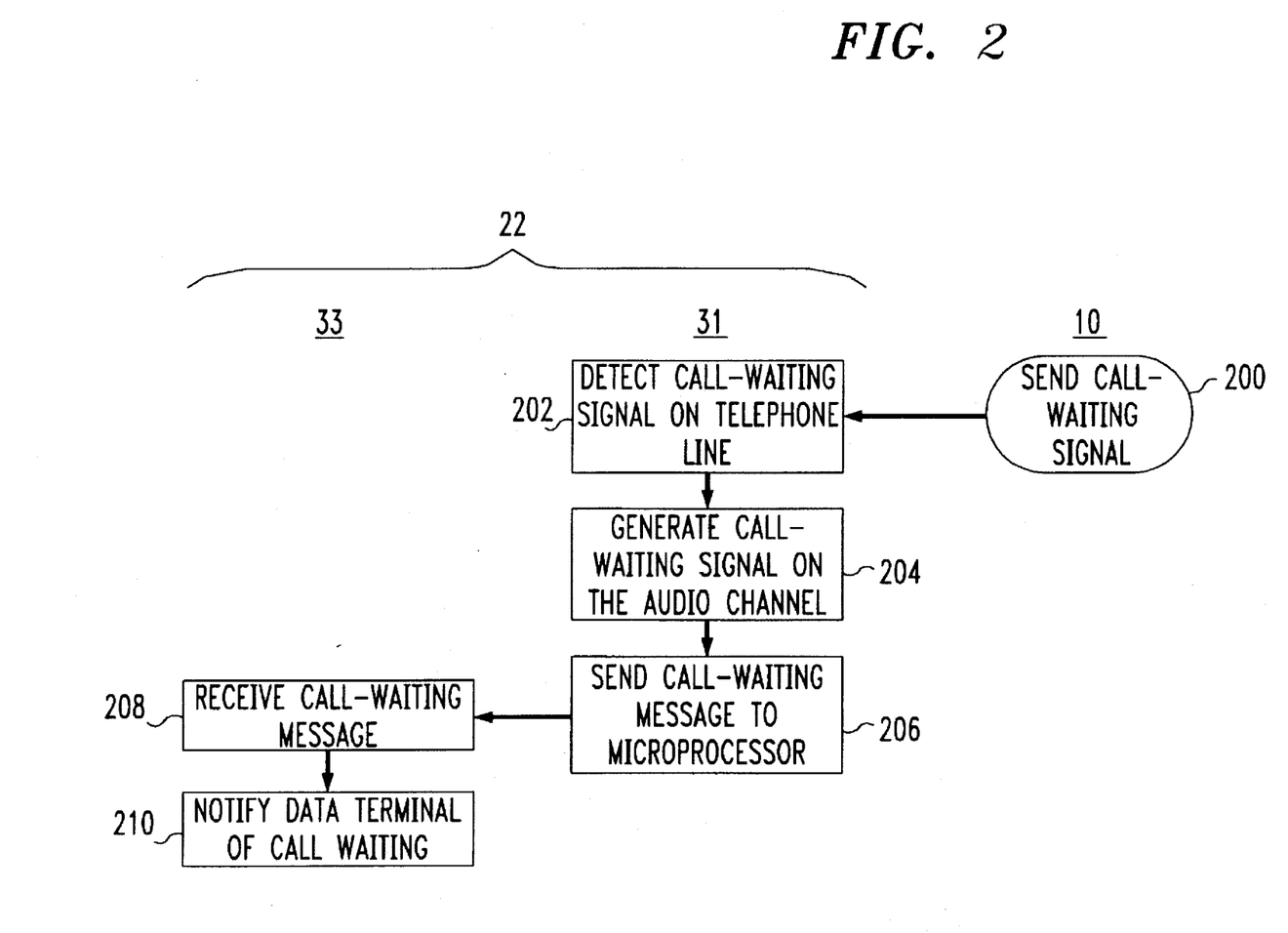

FIG. 2 shows the response of modem 22 of terminal equipment 11 to the call-waiting signal sent by switching system 10 at step 200. According to the invention, DSP 31 is monitoring telephone line 14 for baseband control signals, and upon detecting the call-waiting signal, at step 202 of FIG. 2, that was sent by switching system 10 at step 200, DSP 31 generates a replica of the call-waiting signal on voice channel 23, at step 204. The replica of the call-waiting signal is made audible to the user by voice terminal 20. DSP 31 also sends a call-waiting message (e.g., an interrupt) to microprocessor 33, at step 206. Upon receiving the message, at step 208, microprocessor 33 sends a message to data terminal 21 to advise it that there is another call waiting, at step 210. Data terminal 21 preferably displays a message to the user to advise the user that there is another call waiting, and prompts the user to enter a response.

The user can respond in one of three ways: ignore the waiting call, end the present call, or put the present call on hold and answer the waiting call. The first two of these three scenarios are conventional.

If the user elects to ignore the second, waiting call, nothing further happens with respect to the waiting call from the perspective of modem 22, and the first call continues uninterrupted.

If the user elects to end the first, present, call, the call termination is handled conventionally: data terminal 21 sends a message to microprocessor 33 indicating that the present call is being terminated, microprocessor 33 sends a notification to that effect to DSP 31, and DSP 31 engages in requisite signalling with terminal equipment 12 and switching system 10 to end the call and tear down the call path. Once this is accomplished, switching system 10 and modem 22 interact in a conventional manner to connect the new call to terminal equipment 11, same as if terminal equipment 11 had been idle when the second call was received by switching system 10.

Figure 3:
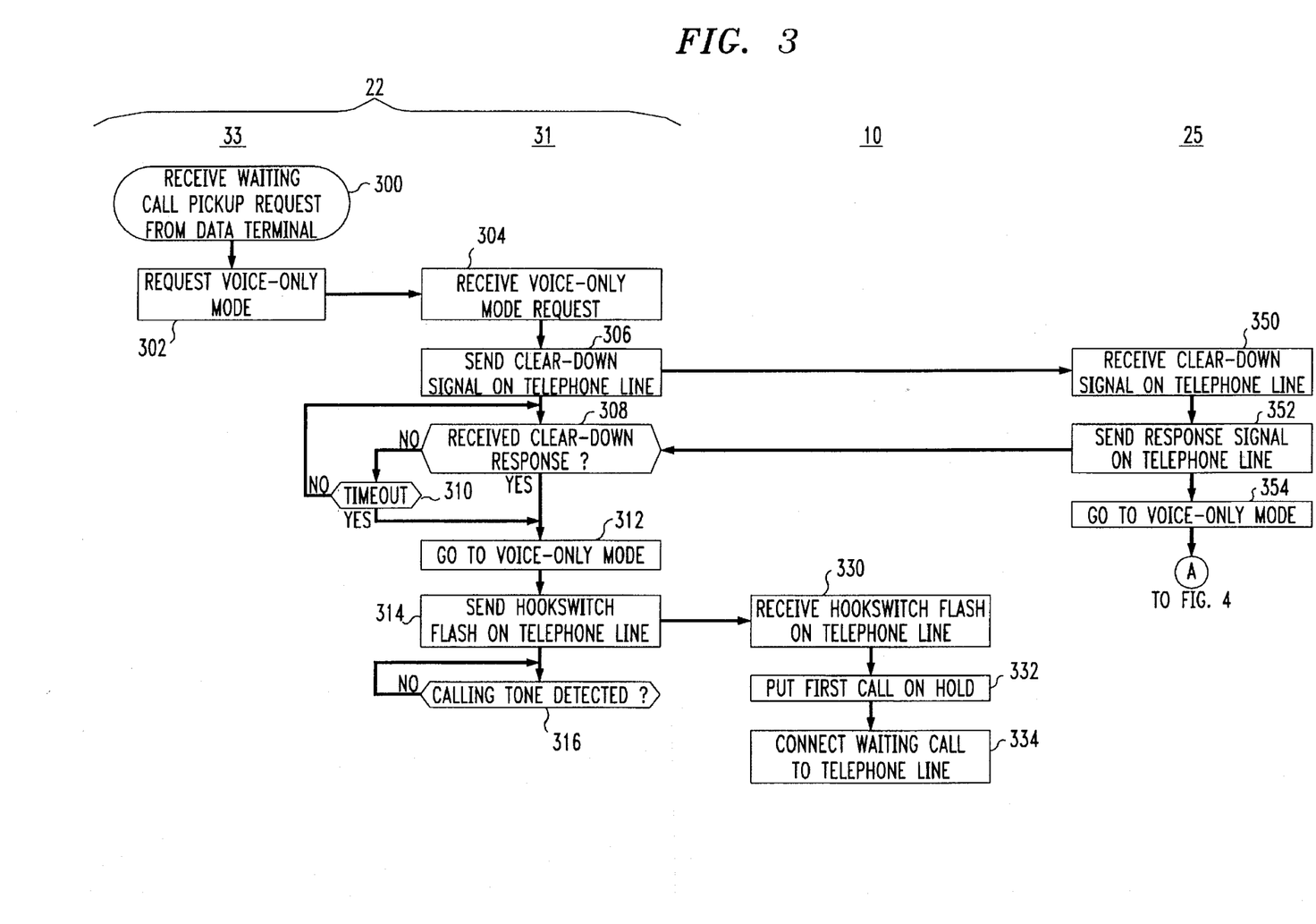

FIG. 3 shows what happens if the user of terminal equipment 11 elects to answer the second, waiting, call. Data terminal 21 sends a message to microprocessor 33 requesting that the waiting call be picked up (i.e., answered), and microprocessor 33 receives the message at step 300. In response, microprocessor 33 requests DSP 31 to take modem 22 into voice-only mode of operation, at step 302. Upon receiving the request, at step 304, DSP 31 of modem 22 sends a conventional modem clear-down signal across the call connection to modem 25 of terminal equipment 12, at step 306. DSP 31 of modem 22 then awaits receipt of a response to the clear-down signal from modem 25 of terminal equipment 12, at step 308. If the response is not received within a predetermined period of time, DSP 31 of terminal equipment 11 proceeds as if the response signal had been received, as indicated at step 310.

Meanwhile, the clear-down signal that was sent by DSP 31 of modem 22 is received by modem 25 of terminal equipment 12, at step 350. Modem 25 responds by sending a response signal across the call connection to terminal equipment 11, at step 352. Modem 25 then goes into voice-only mode, at step 354. Modem 25 now monitors the telephone line 15 for appearance of a calling tone that would signal resumption of normal (voice-plus-data mode) modem communication, at step 470 of FIG. 4. The call now has the form indicated by 504 in FIG. 5.

DSP 31 of modem 22 receives the response signal, at step 308, and responds by going into voice-only mode, at step 312. DSP 31 then generates and sends a conventional hookswitch flash signal on telephone line 14, at step 314. The hookswitch flash signal is detected by switching system 10, at step 330. In response, switching system 10 puts the first call, between terminals 11 and 12, on hold, at step 332, thereby disconnecting it from telephone line 14, and instead connects the second, waiting, call to telephone line 14, at step 334. The call now has the form indicated by 505 in FIG. 5. Terminal 11 now has a voice connection established with the second call, and DSP 31 of modem 22 monitors telephone line 14 for appearance of a calling tone that would signal startup of normal modem communications, at step 316.

The second call can now proceed as a voice-only call, or can be converted into a voice-and-data call, in the conventional manner, by a modem at either end of the call transmitting a conventional calling tone. This form of the call is indicated by 506 in FIG. 5.

To drop the second call and reinstate the original, first, call that is now on hold, the user of terminal 11 either makes an appropriate selection at data terminal 21, such as by clicking a cursor on a displayed reinstate icon if the second call is ending as a voice-plus-data call, or by generating a hookswitch flash at voice terminal 20 if the second call is ending as a voice-only mode call. FIG. 4 shows what happens when the user generates the reinstate request. If the user generated the reinstate request at data terminal 21, data terminal informs microprocessor 33 via a message which microprocessor 33 receives at step 400. In response, microprocessor requests DSP 31 to take modem 22 into voice-only mode of operation, at step 402. Upon receiving the request, at step 404, DSP 31 checks whether modem 22 is already in voice-only mode, at step 405. If so, DSP 31 proceeds to steps 422 et seq.; if not, DSP 31 sends the conventional modem clear-down signal across telephone line 14, at step 406. Since there is presently a connection of telephone line 14 to telephone line 16 and not to telephone line 15 at switching system 10, terminal 13 receives this signal but terminal 12 does not. DSP 31 of modem 22 then awaits receipt of a response to the clear-down signal from terminal equipment 13, at step 408. If the response is not received within a predetermined period of time, DSP 31 of modem 22 proceeds as if the response signal had been received, as indicated at step 410. Upon receipt of the response signal or expiration of the timeout period, DSP 31 of modem 22 goes into voice-only mode, at step 412.

If the user of terminal equipment 11 generated the reinstate request at voice terminal 20 in voice-only mode, DSP 31 of modem 22 receives the hookswitch flash via voice channel 23, at step 420. In response to receipt of the hookswitch flash, or following step 412, DSP 31 of modem 22 generates and transmits a hookswitch flash signal on telephone line 14, at step 422. The hookswitch flash signal is detected by switching system 10, at step 450. In response, switching system 10 terminates the second call and the call's path extending from switching system 10 to terminal equipment 13, at step 452. The call now has the form indicated by 507 in FIG. 5. Switching system 10 then takes the first call off hold, at step 454, thus reconnecting terminal 11 with terminal 12. Terminal 11 now has a voice-only call connection with terminal 12. This is indicated by call 508 in FIG. 5. And both DSP 31 of modem 22 and modem 25 monitor the telephone connection between them for appearance of a calling tone that would signal startup of normal modem communications, at steps 424 and 470, respectively.

Either modem 22 or 25 is free to restart the normal modem communications upon request from its user. If the user of terminal equipment 11 indicates to data terminal 20 a desire to startup the modem, data terminal 20 sends a modem startup request to microprocessor 33, which receives it at step 430 and passes it on to DSP 31 at step 432. DSP 31 receives the request at step 434, and in response generates the conventional modem calling tone on the connection across telephone line 14 with terminal 12. DSP 31 then restarts the voice-plus-data operation of modem 22, in a conventional manner, at step 438. When modem 25 of terminal 12 receives the calling tone that was sent by modem 22 of terminal 11, at step 470, it responds by also restarting its voice-plus-data operation, in a conventional manner, at step 488.

If the user of terminal equipment 12 issues a request to terminal equipment 12 indicating a desire to start up the modem, modem 25 receives the request at step 484, and in response generates the calling tone on the connection with terminal 11. Modem 25 then restarts the voice-plus-data operation, at step 488. When DSP 31 of modem 22 receives the calling tone that was sent by modem 25 of terminal 12, at step 424, it responds by also restarting its modem's voice-plus-data operation, at step 438.

In either scenario, the call is now returned to the state that it had been in prior to switching system 10 sending the call-waiting signal at step 200 of FIG. 2. This is indicated by call 509 in FIG. 5.

Of course, various changes and modifications to the illustrative embodiment described above will be apparent to those skilled in the art. For example, the construction of the modem may be simplified by eliminating the microprocessor and incorporating its functions into the DSP. Conversely, the single DSP may be replaced by separate DSPs for the modem functions and the voice-processing functions. Or, the modem and the telephone may be integrated into a single device. Instead of sending a clear-down signal as a command to the other modem to go into voice-only mode, a modem may simply cease generating the data channel carrier signal to indicate to the other modem to go to voice-only mode. Also, the analog interface of the modem may include voice-recognition circuitry that responds to voice commands from the user, thereby allowing the user to pick up a waiting call and to resume a held call by means of voice commands. Moreover, the modem need not be an analog modem but may be a digital modem. In a telecommunications system that generates multiple types of call-waiting signals, the modem may individually recognize these call-waiting signals and regenerate for the user whichever one of these call-waiting signals has been received. Furthermore, the telephone line may be either an analog or a digital line. In the case of a digital line, the modem employs a vocoder, and sending of the call-waiting signal from the switching system on the digital line involves interruption of the vocoder. Such changes and modifications can be made without departing from the spirit and the scope of the invention and without diminishing its attendant advantages. It is therefore intended that such changes and modifications be covered by the following claims.

The invention claimed is:

1. A voice-and-data modem for use in a telecommunications system wherein receipt of a second communication for connection through the modem while the modem is engaged in a first communication results in receipt of a call-waiting signal at the modem, wherein transmission of a waiting-call acceptance signal from the modem results in the first communication being placed on hold and connection of the second communication to the modem, and wherein transmission of a call-resumption signal from the modem results in disconnection of the second communication from the modem and re-connection of the on-hold first communication to the modem, comprising:

first means for communicating selectively in voice-plus-data mode and in voice-only mode with another voice-and-data modem in the telecommunications system;

second means responsive to receipt of the call-waiting signal, for causing the first means to transmit to the other modem a command to communicate in voice-only mode, for causing the first means to communicate in voice-only mode, and for causing the first means to transmit the waiting-call acceptance signal;

third means for causing the first means to transmit the call-resumption signal when the first means is communicating in the voice-only mode; and fourth means responsive to receipt from the other modem of a command to communicate in voice-only mode, for causing the first means to communicate in voice-only mode.

2. The modem of claim 1 wherein:

the third means comprises selectively-activatable means for causing the first means to transmit a command to communicate in voice-only mode, for causing the first means to communicate in voice-only mode, and for causing the first means to transmit the call-resumption signal.

3. The modem of claim 1 further comprising:

selectively-activatable means for causing the first means to transmit a command to the other modem to change from communicating in the voice-only mode to communicating in the voice-plus-data mode, and for causing the first means to change from communicating in the voice-only mode to communicating in the voice-plus-data mode.

4. The modem of claim 1 wherein:

the first means comprise means for communicating only via a baseband audio channel in the voice-only mode, and means for communicating via a data-modulated carrier first channel and an audio-modulated carder second channel in the voice-plus-data mode.

5. The modem of claim 1 wherein:

the second means comprises means responsive to receipt of the call-waiting signal while the first means is communicating in voice-plus-data mode, for causing the first means to transmit to the other modem a command to change from communicating in voice-plus-data mode to communicating in voice-only mode, for causing the first means to change from communicating in voice-plus-data mode to communicating in voice-only mode, and for causing the first means to transmit the waiting-call acceptance signal; and the fourth means comprises means responsive to receipt from the other modem of a command to communicate in voice-only mode, while the first means is communicating in voice-plus-data mode, for causing the first means to change from communicating in voice-plus-data-mode to communicating in voice-only mode.

6. The modem of claim 5 wherein:

the third means comprise means activatable while the first means is communicating in voice-plus-data mode with a third voice-and-data modem in the telecommunications system, for causing the first means to transmit to the third modem a command to change from communicating in voice-plus-data mode to communicating in voice-only mode, for causing the first means to change from communicating in voice-plus-data mode to communicating in voice-only mode, and for causing the first means to transmit the call-resumption signal.

7. The modem of claim 1 wherein:

the second means comprise means responsive to the receipt of the call-waiting signal, for regenerating the call-waiting signal on an audio channel for a user of the modem.

8. The voice-and-data modem of claim 1 wherein:

the second means comprise selectively activatable means responsive to receipt of the call-waiting signal on a communication line while the first means is engaged in a voice-and-data mode first communication on the communication line with another voice-and-data modem, (a) for causing the first means to transmit across the communication line to the other modem a command to communicate in voice-only mode on the communication line, (b) for causing the first means to communicate in voice-only mode on the communication line, and (c) for causing the first means to transmit the waiting-call acceptance signal on the communication line to cause the first communication to be placed on hold and to cause a second communication to be connected to the modem across the communication line;

the third means comprise selectively activatable means for causing the first means to transmit the call-resumption signal on the communication line after the modem has been connected to the second communication across the communication line to cause the second communication to be disconnected from the communication line and to cause the first communication to be reconnected to the communication line; and the fourth means comprise means responsive to receipt across the communication line of a command to communicate in voice-only mode, while the first means is engaged in a voice-plus-data mode third communication on the communication line with the other voice-and-data modem, for causing the first means to communicate in voice-only mode on the communication line.

9. The modem of claim 8 wherein:

the selectively activatable means of the third means comprise means activatable after the modem has been connected to the second communication and while the first means is communicating in voice-and-data mode, (a) for causing the first means to transmit across the communication line a command to communicate in voice-only mode on the communication line, (b) for causing the first means to communicate in voice-only mode on the communication line, and (c) for causing the first means to transmit the call-resumption signal on the communication line.

10. The modem of claim 8 wherein:

the second means comprise means responsive to the receipt of the call waiting signal, for regenerating the call-waiting signal on an audio channel for a user of the modem.

11. The modem of claim 1 wherein:

the command to communicate in voice-only mode comprises a modem clear-down signal.

12. A first voice-and-data modem for use in a telecommunications system that provides a call-waiting feature, comprising:

first means for communicating selectively in voice-plus-data mode and in voice-only mode on calls with other voice-and-data modems in the telecommunications system;

second means responsive to receipt of a call-waiting signal while the first means is communicating in voice-plus-data mode on a first call with a second voice-and-data modem, for causing the first means to transmit a command to the second modem to communicate in voice-only mode on the first call, for causing the first means to commence communicating in voice-only-mode, and for causing the first means to transmit a waiting-call acceptance signal to effect placing on hold of the first call and connecting of a waiting call to the first modem;

selectively activatable third means for causing the first means to transmit a call-resumption signal to effect disconnecting of the waiting call from the first modem and reconnecting of the first call to the first modem; and fourth means responsive to receipt from the second modem of a command to communicate in voice-only-mode, for causing the first means to communicate in voice-only-mode on the first call.

13. The modem of claim 12 wherein:

the third means comprise means activatable while the first modem is connected to the waiting call and the first means is communicating in voice-plus-data mode on the waiting call, for causing the first means to transmit a command to communicate in voice-only mode on the waiting call, for causing the first means to commence communicating in voice-only mode, and for causing the first means to transmit the call-resumption signal.

14. The modem of claim 12 wherein:

the second means comprise means responsive to the receipt of the call-waiting signal, for regenerating the call-waiting signal on an audio channel for a user of the modem.

* * * * *